US006758018B2

(12) United States Patent
Sutt, Jr.

(10) Patent No.: US 6,758,018 B2
(45) Date of Patent: Jul. 6, 2004

(54) POWER DRIVEN NAILS FOR SHEATHING HAVING ENLARGED DIAMETER HEADS FOR ENHANCED RETENTION AND METHOD

(75) Inventor: Edward G. Sutt, Jr., Jamestown, RI (US)

(73) Assignee: Stanley Fastening Systems, L.P., East Greenwich, RI (US)

( * ) Notice: Subject to any disclaimer, the term of this patent is extended or adjusted under 35 U.S.C. 154(b) by 0 days.

(21) Appl. No.: 10/060,413

(22) Filed: Feb. 1, 2002

(65) Prior Publication Data

US 2003/0145544 A1 Aug. 7, 2003

(51) Int. Cl.[7] .................................................. E04B 2/00
(52) U.S. Cl. ...................... 52/506.05; 52/509; 411/455; 411/442
(58) Field of Search ................................ 52/481.1, 410, 52/506.05, 509, 233, 539, 543; 411/455, 456, 451.1, 442

(56) References Cited

U.S. PATENT DOCUMENTS

| | | | |
|---|---|---|---|
| 159,777 A | | 2/1875 | Sturtevant |
| 430,187 A | * | 6/1890 | Kendall .................. 52/506.05 |
| 1,511,711 A | | 10/1924 | Atwell |
| 2,126,585 A | * | 8/1938 | Stone ......................... 411/455 |
| 3,031,670 A | | 5/1962 | Sillars |
| 3,083,369 A | | 4/1963 | Peterson |
| 3,137,858 A | | 6/1964 | Powers |
| 3,167,778 A | | 2/1965 | Decot et al. |
| 3,851,759 A | | 12/1974 | Young et al. |
| 3,861,527 A | | 1/1975 | Perkins |
| 4,011,785 A | | 3/1977 | Schrepferman |
| 4,679,975 A | | 7/1987 | Leistner |
| 4,804,088 A | | 2/1989 | MacDonald |
| 4,815,910 A | | 3/1989 | Potucek |
| 4,836,372 A | | 6/1989 | Shelton |

(List continued on next page.)

FOREIGN PATENT DOCUMENTS

| | | |
|---|---|---|
| EP | 0 367 936 A2 | 5/1990 |
| EP | 0 460 845 A1 | 12/1991 |

OTHER PUBLICATIONS

"Application Guidelines", Maze Nails Online Catalog, 1995.*
"Stainless Steel Annular Thread Common Nails", Manasquan Premium Fasteners, Oct. 3, 2001.*
Daniel S. Merrick, "Cyclic Comparison Testing of Light Wood Framed Shear Walls", San jose State University, 1999.*
"Installation Instructions", Welsh Mountain Slate Inc., Oct. 18, 2000.*
"Standard Specification for Driven Fasteners: Nails, Spikes, and Staples," *American Society for Testing and Materials*, Jan. 1996, pp. 1–37.
"National Evaluation Report," *National Evaluation Service, Inc.*, Sep. 1, 1997, pp. 1–43.

*Primary Examiner*—Brian E. Glessner
*Assistant Examiner*—Naoko Slack
(74) *Attorney, Agent, or Firm*—Pillsbury Winthrop LLP

(57) ABSTRACT

The present invention provides a nail suitable for sheathing which provides an enhanced resistance to failure. The nail includes an enlarged head as well as a shank having surface deformations. Sheathing panels are secured to a framing structure through the use of the nail. The enlarged head provides a first clamping surface that is seated against an exterior surface of the sheathing panel. The framing structure within which the shank is secured is a second clamping surface. Through the provision of an enlarged head and a shank having surface deformations, the ability of the nail to maintain the securement of the sheathing panel to the framing structure element is enhanced.

31 Claims, 6 Drawing Sheets

U.S. PATENT DOCUMENTS

| | | |
|---|---|---|
| 4,863,089 A | 9/1989 | McCardle et al. |
| 4,877,135 A | 10/1989 | Gabriel et al. |
| 4,971,503 A | 11/1990 | Barnell et al. |
| 5,005,699 A | 4/1991 | Kawashima et al. |
| 5,033,181 A | 7/1991 | Lat et al. |
| 5,056,976 A | 10/1991 | Sygnator et al. |
| 5,140,715 A | 8/1992 | Monacelli |
| 5,409,111 A | 4/1995 | Takumi |
| 5,456,635 A | 10/1995 | Monacelli |
| 5,476,687 A | 12/1995 | Gabriel et al. |
| 5,482,419 A | 1/1996 | Leistner |
| 5,622,024 A | 4/1997 | Habermehl |
| 5,642,974 A | 7/1997 | Gabriel et al. |
| 5,909,993 A | 6/1999 | Leistner |
| 5,921,736 A | 7/1999 | Habermehl |
| 5,934,465 A | 8/1999 | Abbruzzese et al. |
| 5,967,316 A | 10/1999 | Abbruzzese et al. |
| 6,010,291 A | 1/2000 | Schwingle |

\* cited by examiner

US 6,758,018 B2

POWER DRIVEN NAILS FOR SHEATHING HAVING ENLARGED DIAMETER HEADS FOR ENHANCED RETENTION AND METHOD

Reference is made to co-pending applications Ser. Nos. 10/060,411 and 10/067,150, entitled "Packaged Nails Suitable for Sheathing Having Enlarged Diameter Heads for Enhanced Retention," and "Power Driven Nails for Sheathing Having Enlarged Diameter Heads for Enhanced Retention and Method," respectively, and both filed on the same day as the present application and hereby incorporated by reference.

BACKGROUND OF THE INVENTION

Wooden structural elements can be fastened together by driven fasteners such as common nails. Nails have a head and a shank. The head provides an impact surface onto which a force is applied to drive the fastener. The shank typically includes a pointed end opposite the head. The pointed end pierces the wooden structural elements, thus diminishing the force required to drive the nail into the structural element.

Nails are typically used to fasten an outer structural element to an inner structural element. The fastening of an outer and inner wooden structural elements is complete when the head is flush with the outer structural element and the shank has been driven entirely through the outer structural element into the inner structural element.

One specific use of nails is the securement of structural elements such as panelized structural sheathing (plywood, oriented strand board (OSB), etc.) to inner structural framing elements (e.g., joists, 2×4's, and roof rafters). Structural sheathing, as defined by the 1999 APA Panel Handbook & Grade Glossary, which is incorporated herein by reference, is the "structural covering, usually of wood panels or boards, on the outside surfaces of framing. It provides support for construction, snow and wind loads and backing for attaching exterior facing materials such as wall siding, roof shingles or underlayment in double layer floors."

Structural sheathing is typically vulnerable to uplift in a high wind event such as a tornado or hurricane. Structural sheathing is also vulnerable to earthquake loads where large deflections of structural elements, to which the sheathing is secured, may occur. In highly stressed situations, of which high winds and earthquakes are but two examples, retention of the sheathing is necessary to minimize property damage.

There are three types of loading conditions that can occur to cause a nail to fail: an axial force (a load parallel to the nail shank), a shear force (a load perpendicular to the nail shank), and a combination of these two loading conditions. In a situation where a nail is axially loaded the nail can typically fail in one of two modes. A first failure mode is a withdrawal failure. A withdrawal failure occurs when the nail shank withdraws from the inner structural element allowing the outer structural element to separate from the inner structural element. A second failure mode is known as a "pull through" failure. A pull through failure occurs when the nail head is pulled through the outer structural element allowing the outer structural element to separate from the inner structural element. In a situation where the nail is loaded in a shear condition, there are numerous failure modes that can occur: withdrawal, pull through, wood crushing, and nail shank bending. ASTM F1667-95 is the standard specification that covers driven fasteners including common nails. Head sizes for nails such as common nails are specified within this standard. Head size has typically been set for nails such as common nails based on the shank diameter and shank length.

ASTM F1667-95 includes a Table 16, which is the standard specification for nails for use mechanical drivers. The nails listed in this table are denoted as common nails. The nails listed in this table have a length and a shank diameter. However, nail head sizes are not listed in this specification. In Table 15 of the ASTM F1667-95 Standard Specification, the head sizes for common nails which are not mechanically driven are provided. Additionally, it should be noted that nails other than those listed in Table 16 (i.e., Tables 3–15 and 17–55) are typically not specifically specified for use with mechanical drivers and would typically be sold in bulk. However, some of the these other nails are available in a packaged form for use with a mechanical driver.

Head sizes for nails mechanically driven are typically smaller than those which are not mechanically driven (i.e., manually driven). Smaller head sizes are needed for mechanically driven nails because mechanically driven nails are sold more typically in a packaged collated form and there is often a requirement that the nail package be as dense as possible. In particular, packaged nails sold in a stick form typically require a minimum of spacing separating the nail shanks of adjacent nails. For this reason, large head sizes have typically not been used for nails sold in a packaged form. Additionally, small nail head sizes have been used for mechanically driven nails, because larger nail head sizes have been considered detrimental to easily passing through the mechanical driver. Consequently, smaller head sizes have been used for nails which are sold in package form to be driven by mechanical drivers than would be used for manually driven nails sold in bulk. Mechanical drivers also typically have a maximum nail head size that is usable with the mechanism.

NER-272 is the document that governs the design capacities allowed for power driver nails in wood framed construction. Additionally, it is the document that allows the power driven fastener to be utilized in lieu of a hand driven fastener in the major building codes (BOCA, ICBO, and SBCCI). The tables in NER-272 (5–22 and 28–37) specify the nail diameter, length and spacing for use in the attachment of structural sheathing to a framing member for a floor, wall or roof. The nails specified for these structural applications have a length between 1⅝ and 3 inches with a diameter between 0.092 and 0.148 in. Basically, it can be determined that a conventionally acceptable nail for sheathing is:

1. Manufactured from a form of steel wire;
2. Has a single round shank;
3. Has a shank diameter between 0.092 and 0.148 in.; and
4. Has a length between 1⅝ and 3 inches.

In addition to the four criteria listed above, it is also recognized that nails suitable for sheathing preferably have surface deformations, which are typically ring barbs, to provide a resistance to pull out.

There exists a need for a nail that is more cost effective than existing nails that achieve the desired functional characteristics for sheathing nails. There particularly exists a need for such sheathing nails that can be used for high uplift applications, such as roof sheathing.

There is also a need for, in combination, a wooden structural sheathing panel, a framing structure, and a series of nails that is more cost effective than existing structures.

SUMMARY OF THE INVENTION

The nail of the present invention is preferably manufactured from steel wire. The nail comprises a round head having a flat top surface suitable for being driven into a flush relationship with an exterior surface of a sheathing panel and a bottom surface. A single elongate shank that is integral with the head extends from the head bottom surface. The elongate shank further includes a point opposite the head and a plurality of surface deformations disposed on the shank. The surface deformations are configured to provide an enhanced resistance to panel separation by withdrawal of the nail shank from a framing structure. The shank has a substantially round cross-section having a shank diameter between 0.092 and 0.148 in. The nail further has a length defining the distance from the head to the shank point of between 1.625 inches and 3.00 inches. The head diameter provides an enlarged bottom head surface area for engaging the exterior surface of a sheathing panel to enhance resistance to panel separation by head pull through. The ratio of the head diameter to shank diameter is between 2.70 and 3.37.

The present invention also comprises a structure having a wooden structural sheathing panel secured to a framing structure through a plurality of the nails of the present invention. The present further comprises a method of fastening a wooden structural sheathing panel to a framing structure using a plurality of nails of the present invention. The present invention still further comprises a package of collated nails of the present invention.

An outer structural element is secured to an inner structural element through the use of the nail of the present invention. The nail of the present invention has particular benefits in applications such as the securement of outer structural elements such as panelized structural sheathing (plywood, orientated strand board (OSB), etc.) to inner structural framing elements such as joists, 2×4's, and roof rafters, which are typically used in framing structures.

The enlarged head provides a first clamping surface that is seated against an exterior surface of the sheathing panel into which the nail is first driven. The framing structure within which the deformed shank is disposed, is the second clamping surface. Through the provision of an enlarged head and a deformed shank, the ability of the nail to maintain the securement of the sheathing panel to the framing structure is enhanced. The nail of the present invention provides a nail head clamping surface of the necessary size to clamp a sheathing panel between the nail head and a framing structure, within which the deformed shank is disposed.

The shank of the present invention nail includes surface deformations such as rings to resist withdrawal. Accordingly, the deformed shank increases the force required to withdraw the nail shank from the framing structure (i.e. the withdrawal capacity).

The enlarged head of the present invention nail increases the surface area in contact with the exterior surface of a sheathing panel. The enlarged surface area subsequently ensures that a larger area of the sheathing panel would have to be pulled though the nail head for a pull through failure to occur. Accordingly, the pull through capacity of the sheathing panel is correspondingly increased through the use of the nail of the present invention.

The pull through capacity of a sheathing panel may be determined experimentally. The withdrawal capacity of the nail shank may also be determined experimentally. Accordingly, the nails of the present invention may be designed such the withdrawal capacity exceeds the pull through capacity.

One embodiment of a nail manufactured in accordance with the present invention has been shown in experiments to provide up to a 20–97 percent increase in panel uplift capacity as compared to 8d common nails with similar nail spacing. Additionally, the nail of the present invention has been shown in experiments to provide a 14 percent increase in shear capacity and similar energy dissipation as compared to 8d common nails. The enlarged nail head has been shown in experiments to provide a 10 percent increase in pull through capacity as compared to 8d common nails.

The nail of the present invention also has particular benefits in applications such as the securement of outer structural elements such as structural sheathing used in sub-flooring to floor joists or other load bearing structural elements in the sub-flooring. If the nails used to secure the sheathing to the sub-flooring loosen, the floor will squeak. Squeaking floors present a nuisance and source of irritation for home dwellers where this phenomenon occurs. The nail of the present invention provides a clamping force on the sub-floor sheathing. This clamping force minimizes the possibility that nails used to fasten the sub-floor sheathing will loosen and that floors secured by the nails will be less likely to squeak.

Other advantages of the nail of the present invention are also derived from the enlarged diameter nail head. Nails should be driven until the nail head is flush with exterior surface of the sheathing. If the nail is power driven, there is an opportunity to drive a nail beyond the flush position, to a position beneath the exterior surface of the sheathing. The nail head compresses and damages the cellular structure of the sheathing as it is driven past the flush position. The strength of the sheathing is correspondingly lowered as a result of an over driven nail. The enlarged head of the nail of the present invention provides a large surface area that is more easily driven to a position where the head is contacting the exterior surface of the sheathing and is substantially flush with the sheathing surface. The large surface area of the enlarged nail head distributes the driving impact forces over a greater area, thus minimizing the possibility that the nail can be over driven. And, as the structural damage caused by overdriving the nail head is less likely to occur through the use of the nail of the present invention, pull through failures are correspondingly decreased.

These and other aspects and advantages of the invention can be realized by the embodiments of the nail of the invention. Other objects, aspects, and advantages of the embodiments of the invention will become apparent from the detailed description taken in conjunction with the drawings.

DETAILED DESCRIPTION OF THE DRAWINGS

Figure 1:
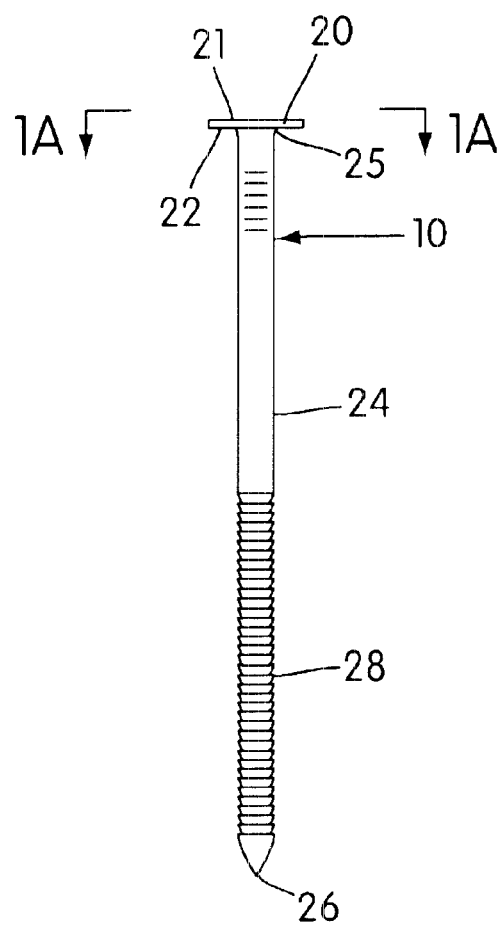
FIG. 1 is a side view of an embodiment of the nail of the present invention.
Figure 1A:
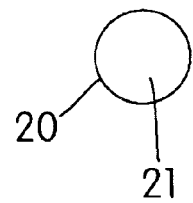
FIG 1A is a top view of the embodiment of the nail of the present invention shown in FIG. 1 taken along line A—A.

FIG. 1 shows an embodiment of the nail 10 of the present invention. The nail 10 is preferably manufactured from a form of steel wire. The steel is preferably plain, zinc coated or stainless steel. The nail 10 includes an enlarged head 20 having a substantially planar, flat top surface 21 and a bottom surface 22. The enlarged head top surface 21 is adapted for receiving a driving impact force, and is particularly suited to be driven by a power driving tool, such as (but not limited to) a pneumatically operated driving tool. The flatness of the top surface 21 enables it to be driven into a flush relationship with the exterior surface of a sheathing panel. The head bottom surface 22 is adapted for contact with an exterior surface of a sheathing panel. The enlarged head 20 preferably has a substantially full round, preferably circular shape, as is shown in FIG. 1A.

The nail 10 also includes a single elongate shank 24 which is integral with the head and extends from the enlarged head bottom surface 22. The shank 24 includes a point 26 opposite the head and a middle position half way between the point 26 and the head 20. The shank 24 has a substantially round, preferably circular cross-sectional shape. The shank 24 preferably includes a plurality of surface deformations, which as shown are preferably spaced apart pointed rings 28. The rings 28 are preferably disposed between the middle position of the shank and the point 26, with the shank 24 being substantially smooth above the rings 28. The rings 28 are preferably not more than halfway up the shank 24 from the point 26, but may be less than halfway up the shank. Each of the rings 28 preferably has a tapered configuration with a larger diameter toward the nail head and a smaller diameter toward the nail point 26. All of the rings 28 preferably have the same configuration. The rings 28 function as a barb and easily penetrate into structural elements but are difficult to extract. The embodiment of the nail 10 shown in FIG. 1 is suitable for wooden structural applications.

Figure 2:
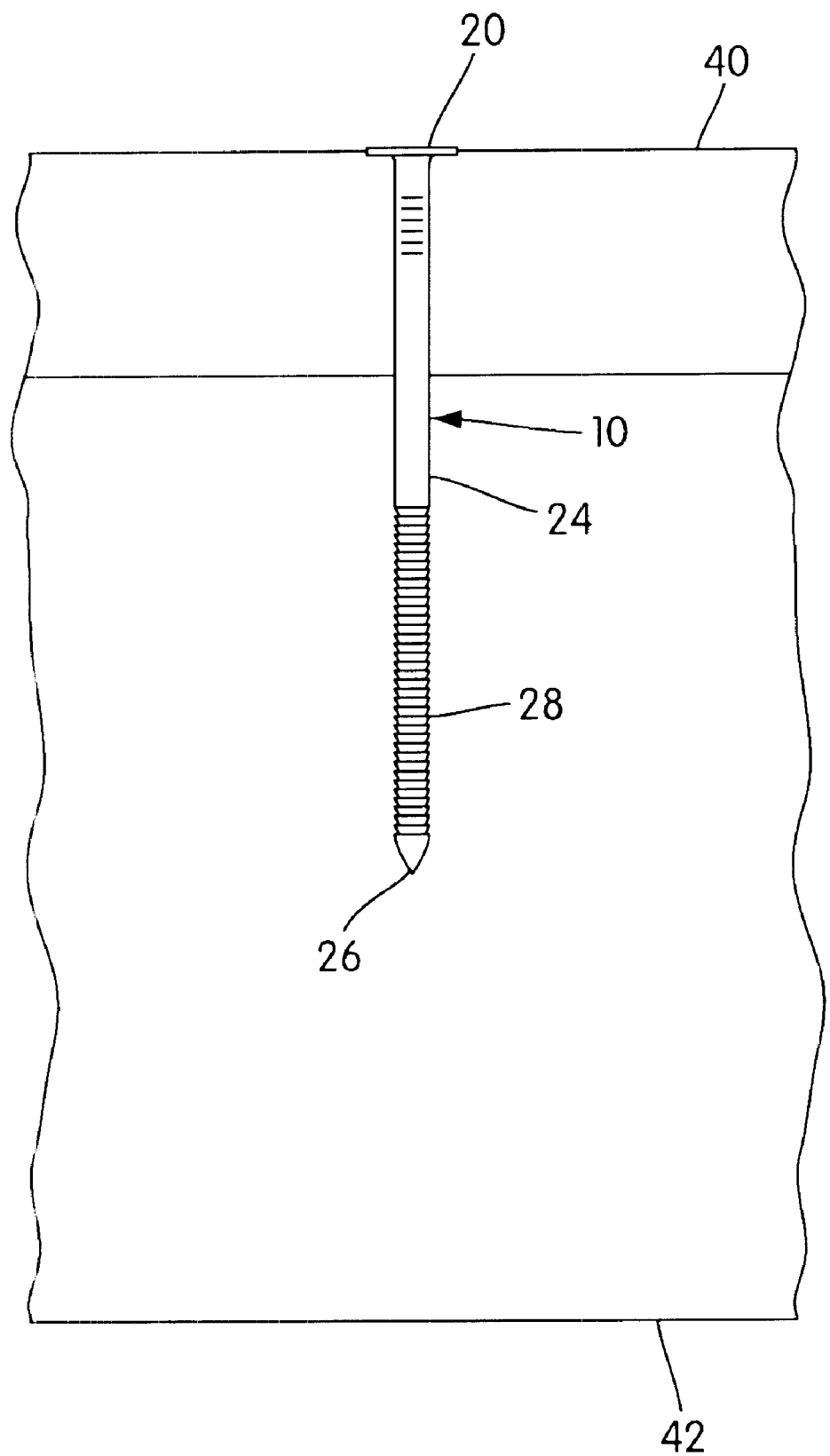
FIG. 2 is a side view of the embodiment of the present invention shown in FIG. 1 used to secure a sheathing panel to a framing structure.

The nail 10 has specific application in the securement of an exterior panelized structural element, such as panelized sheathing, to inner structural framing elements, such as joists, 2×4's and roof rafters, which are commonly used in framing structures. FIG. 2 shows a structural configuration of an outer sheathing panel 40 (in one set of examples the panels 40 may have dimensions in a range of 4' wide×8' long×¼" to 1-⅛" thickness) attached to an inner structural framing element 42 (e.g., a "two-by-four") of a framing structure. As can be seen in this figure, the nail head 20 has been driven until the head 20 is substantially flush with the exterior surface 41 of the sheathing panel 40. The shank 24 is driven entirely through the sheathing panel 40 into the inner structural framing element 42. The shank rings 28 are disposed within the inner structural framing element 42.

The nail 10 provides a clamping force on the sheathing panel 40 securing the sheathing panel 40 to the inner structural framing element 42. Specifically, the nail 10 clamps the sheathing panel 40 between the enlarged head 20 and the inner structural framing element 42, within which the shank 24 is secured.

The enlarged head 20 engages the exterior surface 41 of the sheathing panel 42 with a contact surface having a large area. The large contact surface provided by the enlarged head 20 results in a situation where forces that would potentially loosen the sheathing panel 40 are distributed over the large surface area of the enlarged head. Accordingly, the large contact surface diminishes the chance that the sheathing panel can pull through the nail head 20. The shank rings 28 firmly engage the inner structural framing element 42, thus diminishing the likelihood that the shank can loosen or be pulled from the inner structural element 42, in comparison with an entirely smooth shank. The large surface area of the enlarged head 20 and the secure retention of the shank 24 results in the sheathing panel 40 essentially being clamped between the enlarged head 20 and the inner structural framing element 42.

Figure 3:
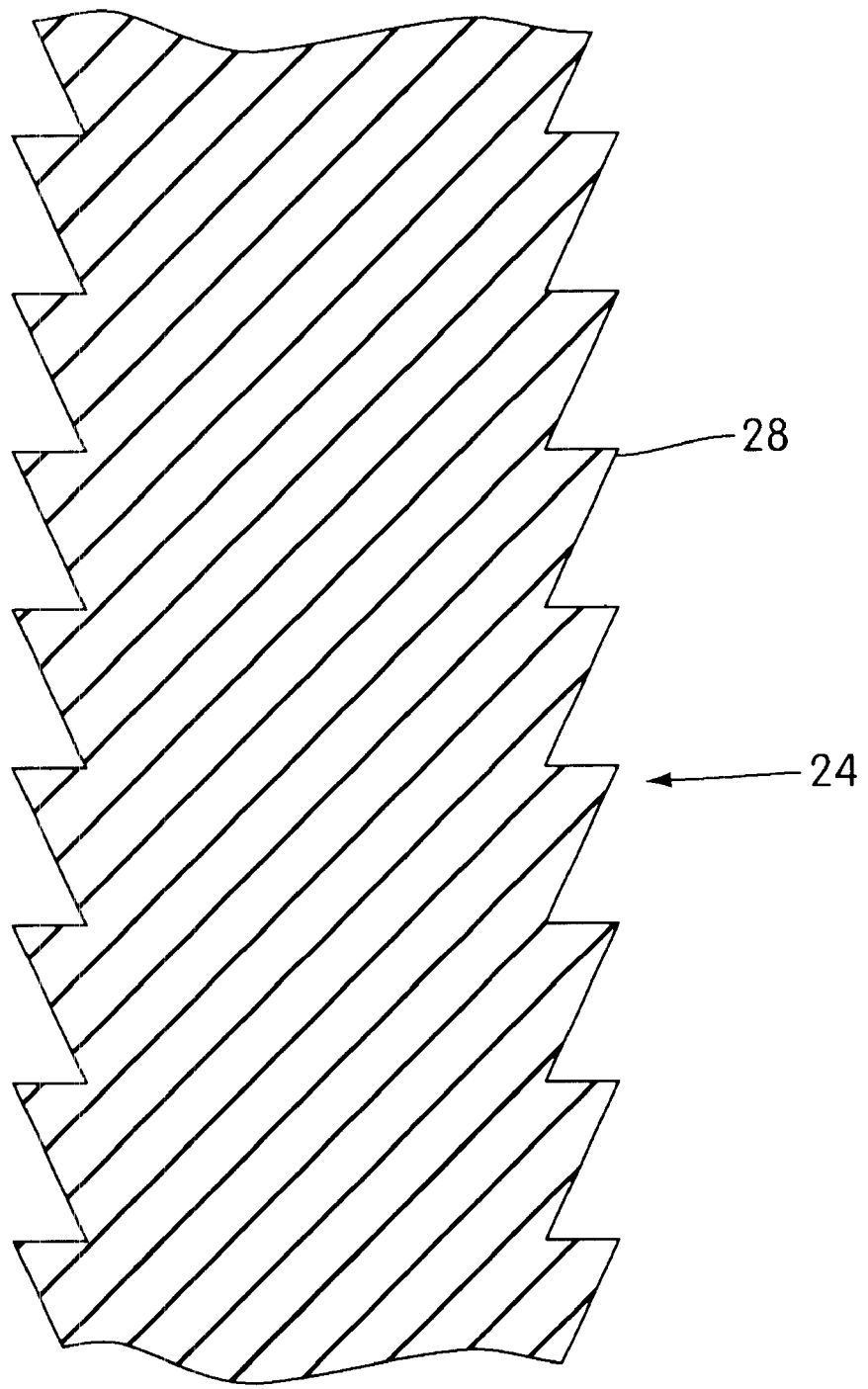
FIG. 3 is an enlarged side view, in cross-section of the embodiment of the present invention in FIG. 1 showing a portion of the deformed shank.

FIG. 3 is an enlarged cross-sectional side view of the embodiment of the present invention in FIG. 1 showing a portion of the shank 24 having the surface deformations. The deformations preferably include the aforementioned spaced apart rings 28, which are disposed along the lower portions of the shank 24, and preferably between the middle position of the shank and the nail point 26.

Figure 4:
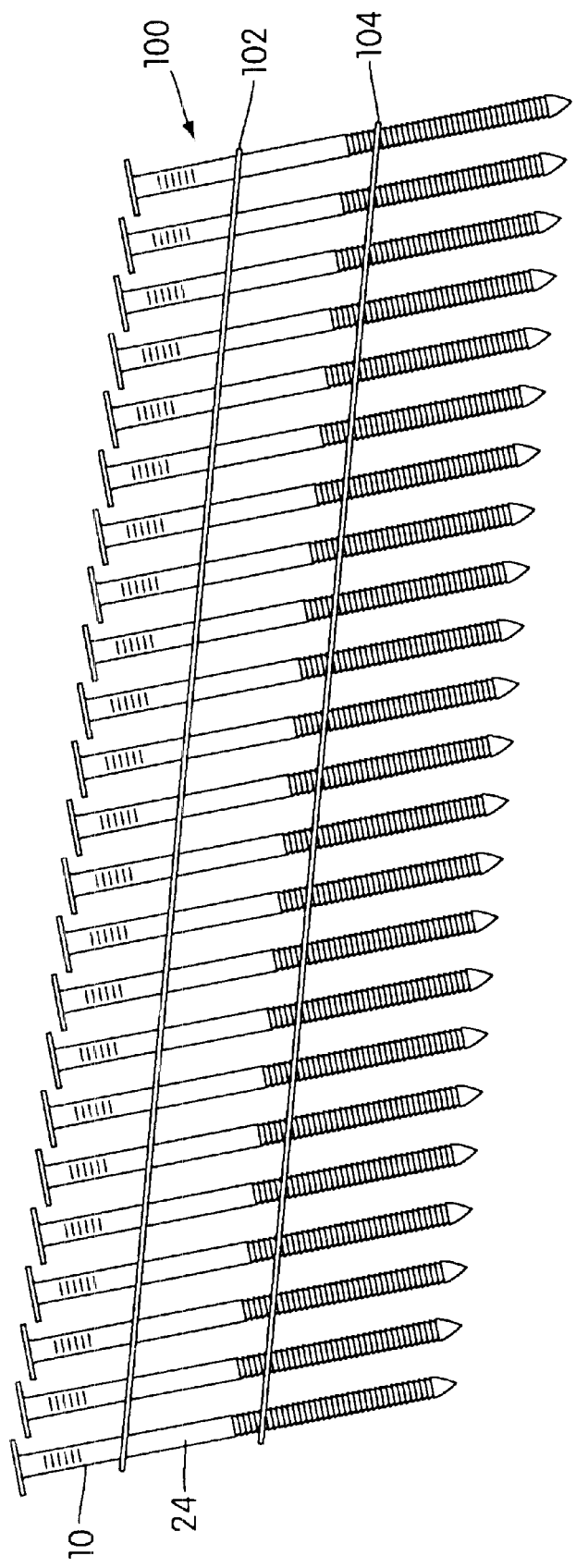
FIG. 4 is a side view of a plurality of nails of the embodiment of the present invention shown in FIG. 1 disposed in a collated package.

FIG. 4 shows a plurality of nails 10 of the present invention disposed in a collated package 100. Frangible wires 102 and 104 are welded to the shanks of each nail. Although the collated nail package 100 shown is in a flattened configuration, it is understood that the frangible wires are flexible and would allow the collated package to be disposed in a coiled configuration.

Figure 5A:
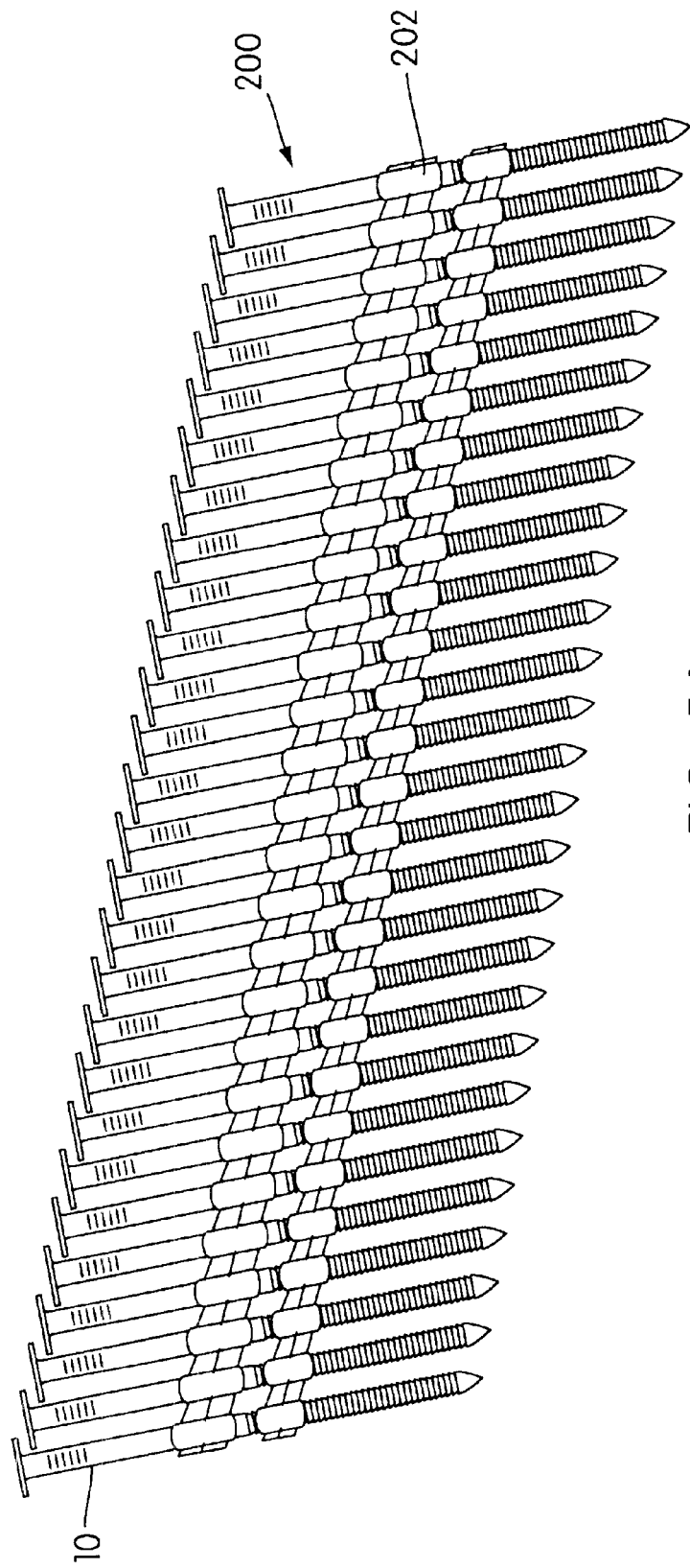
FIG. 5A is a side view of a plurality of nails of the embodiment of the present invention shown in FIG. 1 disposed in a collated stick package.

FIG. 5A shows a plurality of nails 10 of the present invention disposed in a collated package 200. A plastic binding element 202 is used to bind the plurality of nails into the collated package.

Figure 5B:
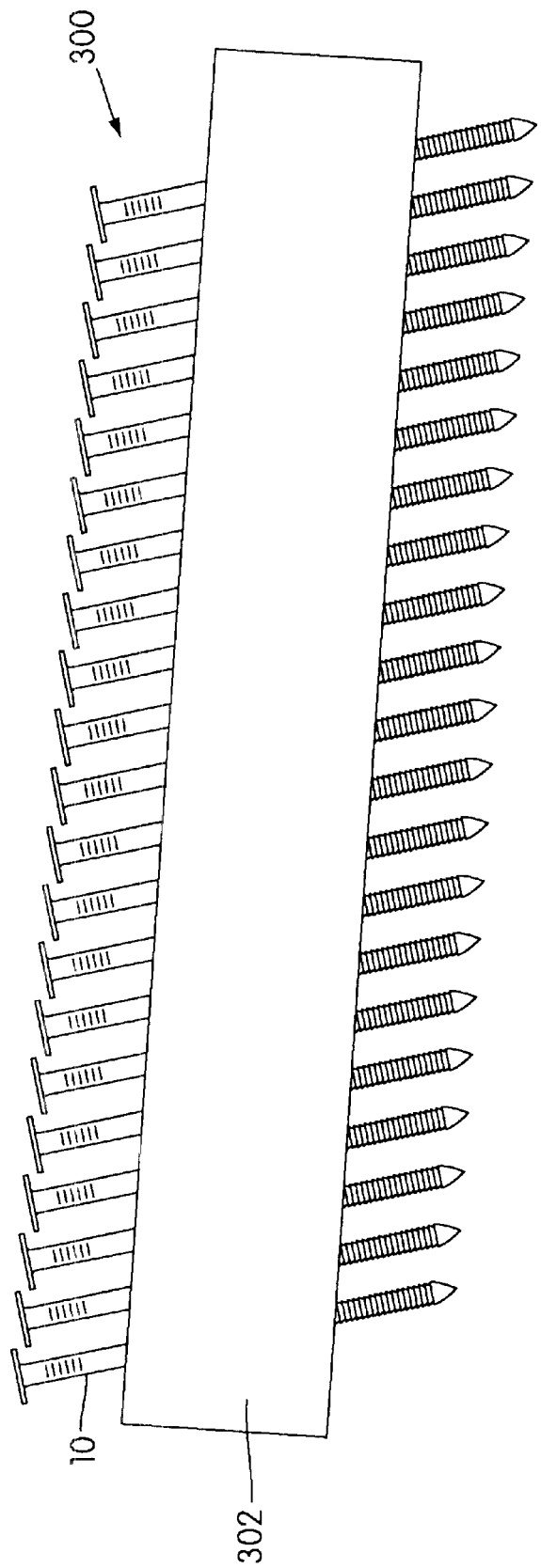
FIG. 5B is a side view of a plurality of nails of the embodiment of the present invention shown in FIG. 1 disposed in another embodiment of a collated stick package.

FIG. 5B shows a plurality of nails 10 of the present invention disposed in a collated package 300. A paper binding element 302 is used to bind the plurality of nails into the collated package.

The package of nails contemplated herein also includes nails connected together in a stick formation as known in the art.

Two specific examples of preferred embodiments of nails manufactured in accordance with the principles of the present invention are as follows. The first specific embodiment includes a length of about 2 inches and a shank diameter of about 0.113 in. The head diameter is about 0.320 in. The ratio of the head diameter to the shank diameter is about 2.83. The shank length to shank diameter is about 17.70, and the shank length to head diameter is about 6.25. The second embodiment includes a length of about 2½ inches and a shank diameter of about 0.113 in. The head diameter is about 0.320 in. The ratio of the head diameter to the shank diameter is about 2.83. The shank length to shank diameter is about 22.12, and the shank length to head diameter is about 7.81.

In accordance with one aspect of the present invention, a maximum head size of 0.320 in. is employed, as this corresponds to the maximum head size that can be used with certain existing commercially available mechanical nail drivers.

The specific embodiments of the present invention described above have particular utility in structural applications where a high resistance to pull through failures is required. For example, the specific embodiments of the present invention described above have particular utility in areas where high uplift forces are present. Accordingly, the nails of the present invention would provide a significant benefits to the attachment of structural roof sheathing to roof trusses or other wooden framing elements used in a roof structure. The specific embodiments of the present invention described above would also provide both strength and stiffness benefits in high shear situations.

It is to be understood that the two embodiments described above are only two out of many different possible preferred embodiments of the nail of the present invention. The various preferred embodiments of the present invention include a length between 1.625 and 3.00 inches, a substantially round, preferably circular cross-section shank having a diameter between 0.092 and 0.148 in., and a head diameter sized such that the ratio of the head diameter to the shank diameter is between 2.70 and 3.37. A more preferred range of the ratio of the head diameter to the shank diameter for the invention would be between 2.70 and 3.00, (i.e., equal to or greater than 2.70 and equal to or less than 3.00). A ratio of the head diameter to the shank diameter over 3.00 typically is more difficult to manufacture than a ratio below 3.00. Nails having a ratio above 3.00 typically require two blows to manufacture the nail head from the steel wire from which the nail is constructed. Nails having a ratio below 3.00 typically require only a single blow to manufacture the nail head.

It is also to be understood that a nail having a ratio of the head diameter to the shank diameter less than 2.70 would not provide the resistance to pull through failures to the extent that is provided by the preferred embodiments of the invention, while providing a resistance to withdrawal and to shear failure. It is also understood that a nail having a ratio of the head diameter to the shank diameter greater than 3.37 would be more suitable for the securement of shingles than for sheathing.

In accordance with NER-272 Section 3.3.2, the shank of the nails of the present invention preferably have a minimum average bending yield strength of 100 KSI (689 MPa) for nails having a nominal diameter of 0.135 in. or less. In addition, nails with diameters greater than 0.135 in. shall have a minimum average bending yield strength of 90 KSI (620 MPa). It must be noted, however, that the present invention includes nails that do not meet the minimum bend yield strength noted above, as not meeting this strength requirement increases ductility and resistance to cyclic shear.

The various preferred embodiments of the invention are preferably provided either in a bulk form or in a packaged collated form that is suitable for use with mechanical drivers such as pneumatic nail guns. Preferred embodiments of packaged collated nails of the present invention were shown in FIGS. 4, 5A and 5B. It is understood that collated nail packages having configurations other than what is shown in FIGS. 4, 5A and 5B are also possible within the scope of the invention.

The various preferred embodiments of the invention preferably include a plurality of surface deformations such as rings. The plurality of surface deformations are disposed on the lower portion of the shank, preferably at least between the middle position of the shank and the point. In another embodiment of the invention, the entirety of the shank between the middle position and the point would include surface deformations. Shank rings of shapes other than what is shown in the preferred embodiment are also possible within the scope of the invention. Additionally, shank deformations other than rings are also possible within the scope of the invention.

In the embodiments shown in FIGS. 1 through 5, nails suitable for sheathing are configured to provide high retention. It is preferable that the nail head diameter, and the corresponding surface area, are sized so that the benefits of the invention are achieved.

While advantageous embodiments have been chosen to illustrate the invention, it will be understood by those skilled in the art that various changes and modifications can be made therein without departing from the scope of the invention.

What is claimed is:

1. In combination, a wooden structural sheathing panel, a framing structure, and a series of nails extending through said sheathing panel into said framing structure so as to secure said sheathing panel in abutting relation to said framing structure and effectively prevent separation of said sheathing panel from said framing structure, each of the nails comprising:

a substantially round head having a flat top surface suitable for being driven to a flush relationship with an exterior surface of said sheathing panel and a bottom surface, the head further having a head diameter, the head diameter providing an enlarged bottom head surface area engaging the exterior surface of the wooden structural sheathing panel to enhance a single elongate shank integral with the head and extending from the head bottom surface through said sheathing panel into said framing structure, the elongate shank further including a point disposed within said framing structure opposite the head, and a plurality of surface deformations formed on the shank, the surface deformations being configured to provide an enhanced resistance to sheathing panel separation by withdrawal of the nail shank from said framing structure, the shank further having a substantially round cross-section having a shank diameter between 0.092 and 0.148 in.;

wherein:

the nail is manufactured from steel wire;

the nail has a length defining the distance from the head to the shank point, the length being between 1.625 inches and 3.00 inches; and the ratio of the head diameter to shank diameter is between 2.70 and 3.37.

2. The combination of claim 1, wherein the surface deformations comprise a plurality of longitudinally spaced apart rings extending radially outwardly from the shank.

3. The combination of claim 1, wherein the surface deformations are disposed at least between a middle position on the shank, halfway between the point and the head, and the point.

4. The combination of claim 1, wherein the head is circular.

5. The combination of claim 1, wherein the shank has a circular cross-section.

6. The combination of claim 1, wherein the length is approximately 2.5 inches, the shank diameter is approximately 0.113 in., the head diameter is approximately 0.320 in., and the ratio of head diameter to shank diameter is approximately 2.83.

7. The combination of claim 1, wherein the length is approximately 2 inches, the shank diameter is approximately 0.113 in., the head diameter is approximately 0.320 in., and the ratio of head diameter to shank diameter is approximately 2.83.

8. A method of fastening a wooden structural sheathing panel to a framing structure using a series of nails extending through the sheathing panel into the framing structure so as to secure the sheathing panel in abutting relation to the framing structure and effectively prevent separation of the sheathing panel from the framing structure by head pull through, the method comprising:

providing a nail manufactured from steel wire, the nail comprising:

a substantially round head having a flat top surface suitable for being driven into a flush relationship with an exterior surface of the sheathing panel and a bottom surface, the head further having a head diameter, the head diameter providing an enlarged bottom head surface area engaging the exterior surface of said wooden structural sheathing panel to enhance resistance to panel separation by head pull through;

a single elongate shank integral with the head and extending from the head bottom surface, the elongate shank further including a point opposite the head, and a plurality of surface deformations formed on the shank, the surface deformations being configured to provide an enhanced resistance to sheathing panel separation by withdrawal of the nail shank from the framing structure, the shank further having a substantially round cross-section having a shank diameter between 0.092 and 0.148 in.; wherein:

the nail has a length defining the distance from the head to the shank point, the length being between 1.625 inches and 3.00 inches; and the ratio of the head diameter to shank diameter is between 2.70 and 3.37;

positioning the wooden structural sheathing panel in abutting relation with the framing structure; and driving the nail through the wooden structural sheathing panel and into the framing structure until the nail head bottom surface engages an exterior surface of the wooden structural sheathing panel and at least a portion of the shank surface deformations are disposed within the framing element.

9. The method of claim 8, wherein the surface deformations comprise a plurality of longitudinally spaced apart rings extending radially outwardly from the shank.

10. The method of claim 8, wherein the surface deformations are disposed at least between a middle position on the shank, halfway between the point and the head, and the point.

11. The method of claim 8, wherein the head is circular.

12. The method of claim 8, wherein the shank has a circular cross-section.

13. The method of claim 8, wherein the length is approximately 2.5 inches, the shank diameter is approximately 0.113 in., the head diameter is approximately 0.320 in., and the ratio of head diameter to shank diameter is approximately 2.83.

14. The method of claim 8, wherein the length is approximately 2 inches, the shank diameter is approximately 0.113 in., the head diameter is approximately 0.320 in., and the ratio of head diameter to shank diameter is approximately 2.83.

15. A package of collated nails suitable for sheathing comprising:

a plurality of nails suitable for sheathing, each nail having:

a substantially round head having a flat top surface suitable for being driven into a flush relationship with an exterior surface of a sheathing panel and a bottom surface, the head further having a head diameter, the head diameter providing an enlarged bottom head surface area for engaging the exterior surface of the sheathing panel to enhance resistance to panel separation by head pull through;

a single elongate shank integral with the head and extending from the head bottom surface, the elongate shank further including a point opposite the head, and a plurality of surface deformations formed on the shank, the surface deformations being configured to provide an enhanced resistance to panel separation by withdrawal of the nail shank from a framing structure, the shank further having a substantially round cross-section having a shank diameter between 0.092 in. and 0.148 in.; wherein each nail is manufactured from steel wire;

each nail has a length defining the distance from the head to the shank point, the length being between 1.625 inches and 3.00 inches; and the ratio of the head diameter constructed to temporarily attach the plurality of nails into a package.

16. The package of collated nails of claim 15, wherein the surface deformations of each nail comprise a plurality of longitudinally spaced apart rings extending radially outwardly from the shank.

17. The package of collated nails of claim 15, wherein the surface deformations of each nail are disposed at least between a middle position on the shank, halfway between the point and the head, and the point.

18. The package of collated nails of claim 15, wherein the head of each nail is circular.

19. The package of collated nails of claim 15, wherein the shank of each nail has a circular cross-section.

20. The package of collated nails of claim 15, wherein the length of each nail is approximately 2.5 inches, the shank diameter is approximately 0.113 in., the head diameter is approximately 0.320 in., and the ratio of head diameter to shaft diameter is approximately 2.83.

21. The package of collated nails of claim 15, wherein the length of each nail is approximately 2 inches, the shaft diameter is approximately 0.113 in., the head diameter is approximately 0.320 in., and the ratio of head diameter to shaft diameter is approximately 2.83.

22. The package of collated nails of claim 15, wherein the attachment elements comprises a frangible plastic element attached to each nail of the package.

23. The package of collated nails of claim 15, wherein the attachment element comprises a frangible wire welded to each nail of the package.

24. The package of collated nails of claim 15, wherein the attachment element comprises frangible paper attached to each nail of the package.

25. A nail suitable for sheathing comprising:

a substantially round head having a flat top surface suitable for being driven into a flush relationship with an exterior surface of a sheathing panel and a bottom surface, the head further having a head diameter, the head diameter providing an enlarged bottom head surface area for engaging the exterior surface of the sheathing panel to enhance resistance to panel separation by head pull through;

a single elongate shank integral with the head and extending from the head bottom surface, the elongate shank further including a point opposite the head, and a plurality of surface deformations formed on the shank, the surface deformations being configured to provide an enhanced resistance to panel separation by withdrawal of the nail shank from a framing structure, the shank further having a substantially round cross-section having a shank diameter between 0.092 in. and 0.148 in.; wherein the nail is manufactured from steel wire;

the nail has a length defining the distance from the head to the shank point, the length being between 1.625 inches and 3.00 inches; and the ratio of the head diameter to shank diameter is between 2.70 and 3.37.

26. The nail of claim 25, wherein the surface deformations comprise a plurality of longitudinally spaced apart rings extending radially outwardly from the shank.

27. The nail of claim 25, wherein the surface deformations are disposed at least between a middle position on the shank, halfway between the point and the head, and the point.

28. The nail of claim 25, wherein the head is circular.

29. The nail of claim 25, wherein the shank has a circular cross-section.

30. The nail of claim 25, wherein the length is approximately 2.5 inches, the shank diameter is approximately 0.113 in., the head diameter is approximately 0.320 in., and the ratio of head diameter to shank diameter is approximately 2.83.

31. The nail of claim 25, wherein the length is approximately 2 inches, the shank diameter is approximately 0.113 in., the head diameter is approximately 0.320 in., and the ratio of head diameter to shank diameter is approximately 2.83.

* * * * *

UNITED STATES PATENT AND TRADEMARK OFFICE
CERTIFICATE OF CORRECTION

PATENT NO.     : 6,758,018 B2
DATED          : July 6, 2004
INVENTOR(S)    : Edward G. Sutt, Jr.

Page 1 of 1

It is certified that error appears in the above-identified patent and that said Letters Patent is hereby corrected as shown below:

Column 10,
Line 12, after "diameter" please insert the following:
-- to shank diameter of each nail is between 2.70 and 3.37; and at least one attchment element --.
Line 37, replace "elements" with -- element --.

Signed and Sealed this

Second Day of August, 2005

JON W. DUDAS
*Director of the United States Patent and Trademark Office*